June 12, 1956  A. SCHWARTZ ET AL  2,750,313
THERMAL INSULATION
Filed Aug. 14, 1953  3 Sheets-Sheet 2

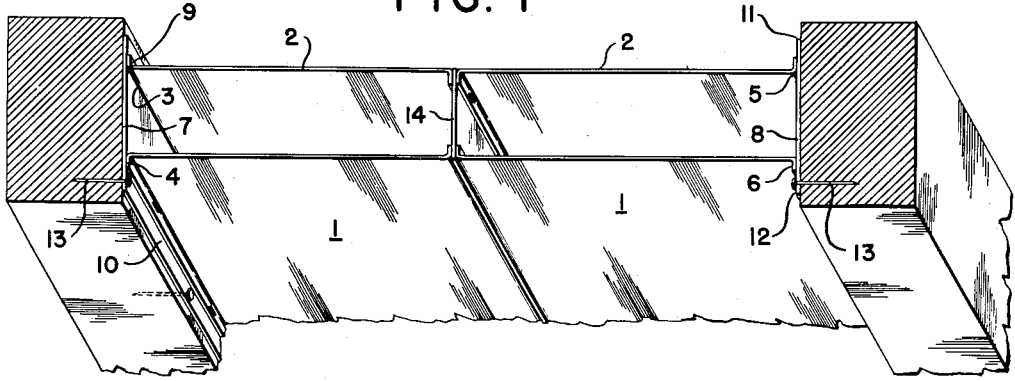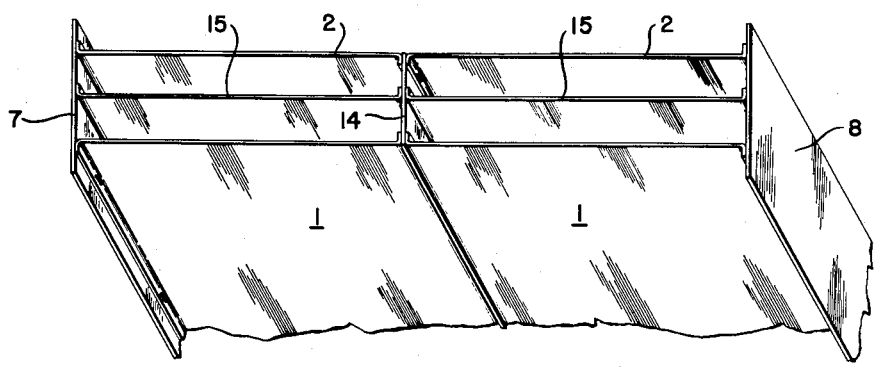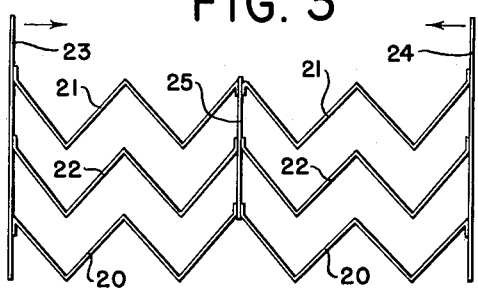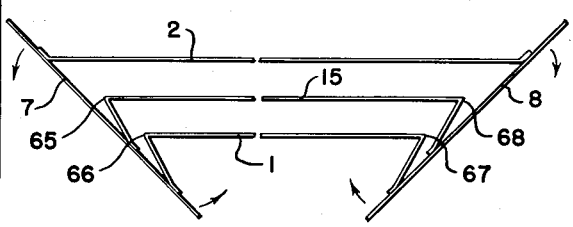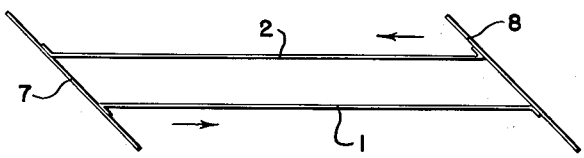

INVENTORS
Alexander Schwartz
Emile Fogelson
BY
ATTORNEYS

June 12, 1956  A. SCHWARTZ ET AL  2,750,313
THERMAL INSULATION
Filed Aug. 14, 1953  3 Sheets-Sheet 3

INVENTORS
Alexander Schwartz
Emile Fogelson
BY
ATTORNEYS

United States Patent Office 2,750,313
Patented June 12, 1956

2,750,313

THERMAL INSULATION

Alexander Schwartz and Emile Fogelson, New York, N. Y., assignors to Leobarb Corporation, New York, N. Y., a corporation of New York Application August 14, 1953, Serial No. 374,198

5 Claims. (Cl. 154—45)

This invention relates to thermal insulation of general utility of the type suitable for use in buildings, refrigerators, vehicles, boxes and the like, and has for its object the provision of an improved insulation of this character. More particularly, the invention is concerned with insulation in the form of thin sheets which may be supported in stretched positions by supporting or attaching members. The invention provides composite insulating products or structures formed of a plurality of sheets connected together and arranged to be installed as an integral structure.

The composite insulation of the invention comprises two or more sheets of insulating material such as metal foil, laminated metal foil and paper, asbestos, plastic, or paper. The insulation may be formed entirely of one of these sheet materials or of combinations thereof. In accordance with our invention, we prefer to form the insulation of continuous sheets or webs of more or less indefinite length and to connect the edge portions of the sheets to supporting edge strips of sheet material which provide a means to hold the insulating sheets in spaced relation with respect to each other when installed and a means for attaching the insulation in the place of use such as to the framing structure of a building or the like.

For convenience, in describing the invention, the two exterior sheets shall be referred to herein as the "front sheet" and the "back sheet" and other sheets interposed therebetween as "intermediate sheets." While the insulation of the invention may consist of but the front and back sheets, it may also include any desired number of intermediate sheets. The insulation of the invention is so constructed that the supporting edge strips and insulating sheets may be arranged in superposed close contact with each other and pressed together into a flat strip which can be cut into suitable lengths or wound into rolls of any convenient size for packaging and shipping.

In one preferred form of our insulation, we provide edge strips of relatively stiff sheet material, such as dense paper or other suitable sheet material, which has sufficient rigidity to hold the insulating sheets in spaced relation when the insulation is installed. The insulating sheets are attached along their lengthwise edges to the edge strips at positions spaced apart and at least one of the sheets is spaced inwardly from one edge so as to leave an area or panel along one edge of the strip for attachment to a framing structure. By "framing structure" is meant furring strips, beams, rods, bars, studs, joists, rafters or the like to which the insulation is to be installed. The relatively stiff edge strips not only hold the insulating sheets in spaced relation, preferably parallel to each other, but they hold the insulation in close contact with the framing structures to which they are attached.

In another form of the invention the insulating sheets are attached to edge strips formed of fairly tough but flexible material, such as kraft paper, in spaced relation and also spaced inwardly from the edges to provide edge panels for attachment to the framing structures. These edge strips are initially attached along one edge panel and then the strip is pulled taut and the other edge panel is attached thereby applying tension on the insulating sheets to pull them to a taut spanning position. When two insulating sheets are attached to these edge strips they are both the same width but when attached are slightly narrower than the space between the framing structures, but when three or more sheets are used the intermediate sheets are shorter than the exterior front and back sheets so that they will all be stretched taut to approximately the same extent.

The insulation may be folded flat with the edge strips lying in parallel close contact with the insulating sheets, or the insulating sheets may be accordion pleated and the insulation compressed into a narrow strip between the edge strips. The insulation may be cut into short sections or wound into rolls for packaging.

The insulation preferably comprises at least one sheet of aluminum foil or laminated paper and foil, and the other sheets of aluminum foil, paper or asbestos. In a preferred form of insulation, consisting of but front and back sheets, such sheets are preferably formed of aluminum foil or laminated foil and paper, and when an interposed or intermediate sheet is used, it is preferably formed of paper. In another form of insulation consisting of five sheets, the front and back sheets are also preferably formed of aluminum foil, one of the intermediate sheets may be formed of aluminum foil and the other sheets of paper.

The insulation of the invention is a very effective insulation medium against the transmission of heat by conduction, convection and radiation. When one or more of the sheets of insulation are formed of metal foil, such as aluminum foil, the insulation is a very effective barrier against the transmission of radiant heat. In providing an effective insulation against the transmission of radiant heat, we prefer to construct the insulation so that when it is installed between the framing structures of a building, for example the wall studs, and the sheets are in stretched spanning position, they are supported or held in substantially parallel spaced position at least three-quarters of an inch apart.

These and other objects of the invention will be better understood after considering the following discussion taken in conjunction with the accompanying drawings, in which:

Fig. 1 is a perspective of one form of insulation of the invention shown attached to framing structures;

Fig. 2 is a perspective of a modification of the insulation of Fig. 1;

Fig. 3 is an end view of the insulation of Fig. 2 when accordion pleated and in a partially compressed position;

Fig. 4 is an end view of the insulation of Fig. 1 showing one manner of folding to a flat position;

Fig. 8 is an end view of the insulation of Fig. 6, illustrating one method of folding the insulation to a flat position for packaging.

Figure 5:
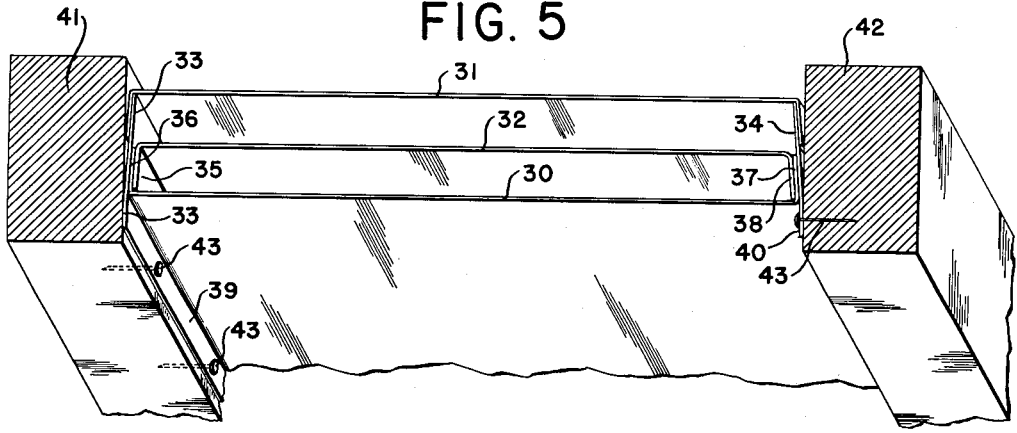
Fig. 5 is a perspective of another form of insulation of the invention shown attached to framing structures.

The thermal insulation illustrated in the drawings comprises two or more sheets of insulating material formed of any suitable sheet material, such as aluminum foil, laminated aluminum foil and paper, plastic, asbestos, or paper, or of combinations of these sheet materials. We prefer to form the insulation of at least one sheet of aluminum foil or laminated aluminum foil and paper. In all forms of our insulation, the attachment of the insulating sheets to the supporting edge strips may be made by crimping, stitching, stapling, or adhesive bonding, and the attachment of the edge strips to the framing structures may be by nails, staples or adhesive.

In all embodiments of our invention when we use aluminum foil, the foil should be preferably dead soft aluminum varying, say, from 0.00025 to 0.006 inch in thickness. When paper is used, we prefer to use kraft paper of any suitable weight, say, from 18 pounds to 100 pounds base weight and preferably paper treated with fire, vermin and fungus retarding agents.

The insulation illustrated in Fig. 1 comprises front sheet 1 and back sheet 2, the longitudinal lengthwise edges of which are attached at 3, 4 and 5, 6 at spaced positions inwardly from the edges of the supporting edge strips 7 and 8, respectively, so as to leave the extending edge panels 9, 10, 11 and 12 for attaching the insulation to the framing structure, as with the nails 13. An interior spacing strip of sheet material 14 may be attached between sheets 1 and 2 to support the sheets in spaced relation. In forming sheets 1 and 2 of aluminum foil, the distance between the sheets may be advantageously at least ⅜ inch to provide the most effective insulation for radiant heat. The supporting edge strips 7 and 8 are preferably formed of a stiff dense paper or other suitable sheet material.

A fibrous material, such as paper, is advantageous for the strips because it is not a good conductor of heat from sheet 1 to sheet 2. This insulation may be folded either as shown in Fig. 4 or as shown in Fig. 8 to a flat position with the strips 7 and 8 in close contact with the sheets 1 and 2. The metal strips are attached in such a way to the edge strips as to keep them out of contact with each other and prevent the flow of heat therebetween by conduction.

Fig. 2 illustrates a modification similar to the insulation of Fig. 1 having an intermediate sheet of insulation 15. This form of insulation may be constructed similarly to that of Fig. 1 and installed in the same manner. It may also be folded flat as in the case of the insulation of Fig. 1.

Fig. 3 illustrates a modification of the insulation of Fig. 2 comprising front sheet 20, back sheet 21, intermediate sheet 22, supporting edge strips 23 and 24 and an interior spacing strip 25. Sheet 25 may be omitted when desired. In this form of the invention, sheets 20, 21 and 22 are accordion pleated and the insulation is shown in a partly expanded position. The insulation may be compressed into thin narrow strips of indefinite length for storage or shipment or pulled out to their fully expanded position for installation, at which time the sheets 20, 21 and 22 assume flat parallel positions as in Fig. 2.

Fig. 4 illustrates an intermediate stage in one manner of folding the insulation of Fig. 1. Further movement of sheets 1 and 2 in the direction of the arrows will result in the complete collapse of the insulation with end strips 7 and 8 lying in contact with, and substantially parallel to, sheets 1 and 2. Any of the other forms of insulation except when accordion pleated as in Fig. 3 may be folded in this manner.

The insulation illustrated in Fig. 5 comprises front sheet 30, back sheet 31, and intermediate sheet 32, and supporting edge strips 33 and 34 of relatively stiff dense paper or the like as aforementioned. Sheet 31 is folded over the upper edges and attached to the backs of strips 33 and 34. Sheets 30 and 32 are folded at right angles along their lengthwise edges and the lateral edge panels 35, 36 and 37, 38 are attached to each other and to edge strips 33 and 34 in such spaced position that sheets 30, 31 and 32 are held equidistant apart and parallel to each other. Instead of attaching the panels 35, 36, 37 and 38 to the edge strips 33 and 34 in the overlapping positions shown, the panels of sheet 30 may be turned downward and attached to strips 33 and 34 at a position spaced from the panels of sheet 32. The attachment panels 39 and 40 extending lengthwise of edge strips 33 and 34 provide convenient means for attaching the insulation to the framing studs 41 and 42, as with the nails 43. Notwithstanding the fairly stiff character of the supporting edge strips 33 and 34, there is a tendency for them to be pulled inward and away from the inner faces of the studs at their upper free ends. In order, therefore, to provide for the substantially uniform taut state of the three insulating sheets, sheet 30 has a width approximately the width of the span between the studs; sheet 32 may be slightly narrower, and sheet 31 may also be still narrower, whereby all three sheets assume substantially flat parallel positions when installed as illustrated.

Figure 6:
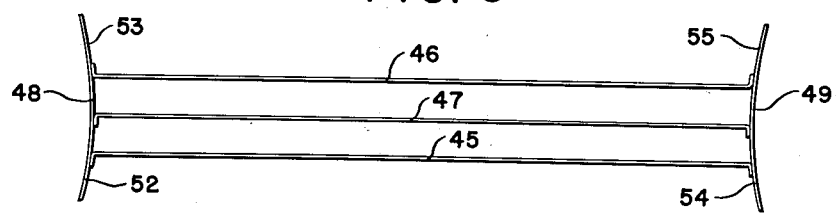
Fig. 6 is an end view of still another form of insulation of the invention.
Figure 7:
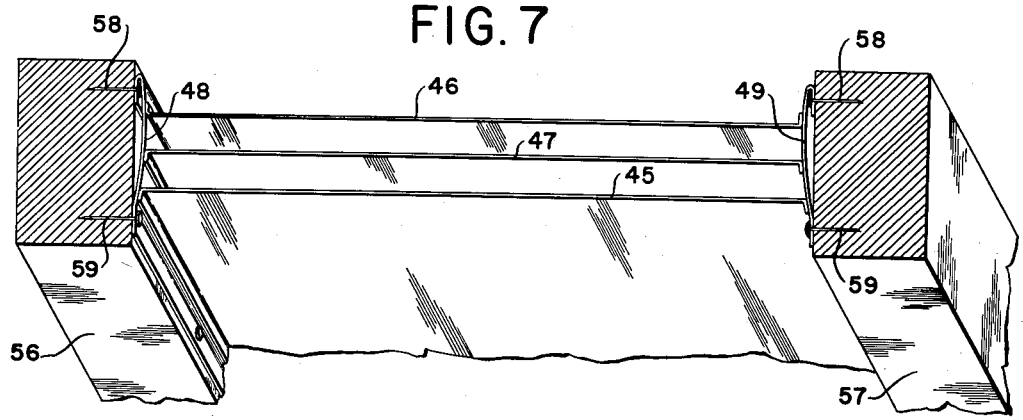
Fig. 7 is a perspective of the insulation of Fig. 6 shown attached to framing structures.

The insulation illustrated in Figs. 6 and 7 comprises a front sheet 45, a back sheet 46, and an intermediate sheet 47. The lengthwise edges of these insulating sheets are attached to supporting edge strips 48 and 49 in such spaced relation that they are substantially equidistant apart and parallel to each other. Sheets 45 and 46 are attached inwardly from the lengthwise edges of strips 48 and 49 so as to provide the attachment panels 52, 53, 54 and 55 for attaching the strips to the framing structures. Edge strips 48 and 49 are preferably formed of strong yet quite flexible material such as dense paper as aforementioned. It will be noted with reference to the drawings that the intermediate sheet 47 is narrower than sheets 45 and 46 and, consequently, when the sheets are in stretched flat parallel position, the edge sheets have a slightly arcuate shape.

The form of insulation illustrated in Figs. 6 and 7 is supplied for installation in a flat condition, as previously described. The mechanic installing the insulation first attaches the attaching panels 53 and 55 to the studs 56 and 57, as with the nails 58, while these panels are lying flat. After this attachment has been made, the insulation is pulled forward (downward as viewed in Fig. 7) to fold the edge panels 53 and 55 over the nails 58. By holding the edge panels 52 and 54 and pulling them downward with appreciable tension, the edge strips assuming the arcuate positions shown, and the panels 52 and 54 are then attached to the studs as with nails 59. While Figs. 6 and 7 exaggerate somewhat the arcuate shape of edge strips 48 and 49, there is a sufficient component force acting in the direction of the studs to pull the insulating sheets to the flat spanning position shown.

Fig. 8 illustrates an intermediate stage in the folding of the insulation of the type shown in Fig. 2. It will be noted that sheets 1 and 15 are creased to effect folds at 65, 66, 67 and 68 to permit the edge strips 7 and 8 to be swung on the connections with sheets 2 as pivots until they reach flat positions in contact with sheets 1, 2 and 15 and are substantially parallel thereto. Any of the forms of insulation illustrated, except when accordion pleated as in Fig. 3, may be folded to flat compact positions for storage and shipment as illustrated in Fig. 8.

The insulation of the invention may, accordingly, be folded, as in Fig. 3, when the sheets are accordion pleated, or folded either as shown in Fig. 4 or as shown in Fig. 8 when the insulating sheets are retained in flat form.

Figure 9:
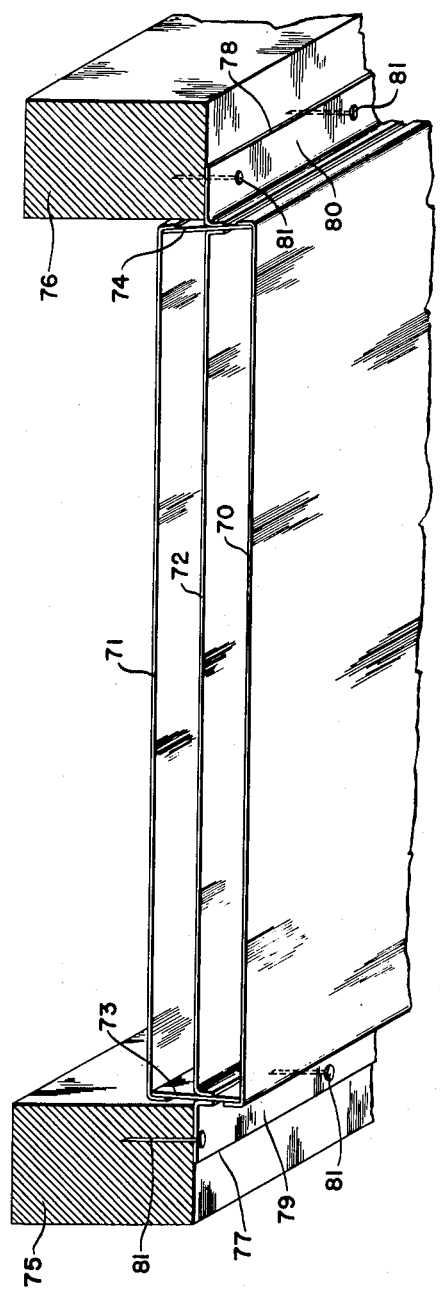
Fig. 9 is a perspective of another form of insulation of the invention shown attached to framing structures.

Fig. 9 illustrates another embodiment of the invention comprising front sheet 70, back sheet 71, and intermediate sheet 72 which are attached lengthwise along their edges to two supporting edge strips 73 and 74. The edge strips 73 and 74 are preferably formed of relatively stiff paper or other suitable sheet material, and the lengthwise upturned edges of sheet 70 are bent over the lower edges of strips 73 and 74 and attached along the surfaces facing the framing structures 75 and 76. The downwardly bent lengthwise edge portions of intermediate sheet 72 are attached to the opposite or inner faces of the edge strips 73 and 74 so that sheet 72 assumes a position spaced equidistant between sheets 70 and 71. Sheet 72 may be substantially the same length as sheets 70 and 71 and the three sheets assume substantially parallel spaced positions when installed as shown in Fig. 9. However, sheet 72 may be wider than sheets 70 and 71 so that when it is pleated it assumes a zigzag spacing position between the front and back sheets.

Attaching edge strips 77 and 78 of fairly strong and tough sheet material are bent at right angles and attached to the outer faces of edge strips 73 and 74. The attaching panel portions 79 and 80 are so located that they project from the centers of the supporting edge strips 73 and 74 and provide means for attaching to the framing structures 75 and 76, as with the nails 81. It will be noted that this form of insulation is attached to the narrow edge facing of the framing structures and that only a part of the insulation actually is inserted between the structures, a part of the insulation depending as viewed in Fig. 9. This kind of insulation may be installed most effectively between roof rafters where the depending portion offers no obstruction. When this insulation is to be attached to wall studs or floor joists, if one wishes furring strips may be attached to the framing structures over panels 79 and 80 to enable plaster, flooring, sheathing or the like to be applied.

The insulating sheets in the various modifications of insulation can be formed of any suitable kind of insulating sheet material, preferably of the kind supplied in rolls of indefinite length. The insulation not only is a good insulator against the transfer of heat by conduction and convection but it is an especially effective insulating medium against radiant heat transfer when one or more of the sheets are made of aluminum foil or laminated aluminum foil and paper. One important feature of our invention is that the edge strips are preferably formed of non-conducting material, and when the insulating sheets are formed of aluminum foil they may be so attached to the edge strips that they are not in contact with each other when the insulation is installed. The insulation has the further important characteristic of prividing an effective barrier against the transmission of vapor moisture, and has the additional virtue of being to a large extent non-condensation forming.

We claim:

1. An improved thermal insulation which comprises at least two insulating sheets of indefinite length and formed of thin flexible material including aluminum foil, two supporting edge strips of sheet material which are relatively narrow with respect to their length and with respect to the insulating sheets, said edge strips being relatively stiff compared to the insulating sheets, said insulating sheets having thin edge portions bent at right angles forming lateral edge panels which are attached to the edge strips, said edge strips forming means for holding the insulating sheets in spaced apart relation when the insulation is installed between framing structures, and one attaching panel formed lengthwise along the longitudinal edge of each edge strip providing means for attaching insulation to a framing structure with the remaining major portion of the edge strips unattached, said insulating sheets comprising a front sheet and a back sheet, the spanning width of the front sheet between the edge strips being wider than the spanning width of the back sheet between the edge strips, whereby when the edge strips are placed in contact with the inner opposite parallel faces of two framing structures and the attaching panel of each edge strip is attached to a framing structure the edge strips hold the insulating sheets in stretched taut positions, the edge strips being sufficiently stiff that although they bend inwardly away from the framing structures at their unattached portions they hold both insulating sheets taut.

2. An improved thermal insulation according to claim 1 which comprises a back sheet having lateral edge panels attached to the unattached edge portions of the edge strips along the sides of the edge strips facing the framing structures.

3. An improved insulation according to claim 1 which comprises a front insulating sheet, a back insulating sheet, and at least one intermediate sheet attached lengthwise along its edges to the edge strips between the front and back sheets and in spaced parallel relation thereto.

4. An improved insulation according to claim 1 which comprises a front insulating sheet, a back insulating sheet, and at least one intermediate sheet attached lengthwise along its edges to the edge strips between the front and back sheets and in spaced parallel relation thereto, said intermediate sheet being narrower than the front sheet.

5. An improved insulation according to claim 1 which comprises front and back insulating sheets formed of aluminum foil spaced at least three-eighths of an inch apart and supported out of direct contact with each other when the insulation is installed.

References Cited in the file of this patent

UNITED STATES PATENTS

| | | |
|---|---|---|
| 1,954,582 | Aschenbrener | Apr. 10, 1934 |
| 1,963,609 | Balduf et al. | June 19, 1934 |
| 2,101,836 | Benedict | Dec. 14, 1937 |
| 2,251,585 | Finck | Aug. 5, 1941 |
| 2,312,301 | Turner et al. | Mar. 2, 1943 |
| 2,332,287 | Zalkind | Oct. 19, 1943 |
| 2,569,234 | Finck | Sept. 25, 1951 |